W. Johnson,
Animal Tether,
No. 49,681. Patented Aug. 29, 1865
Fig. 1.
Fig. 2.
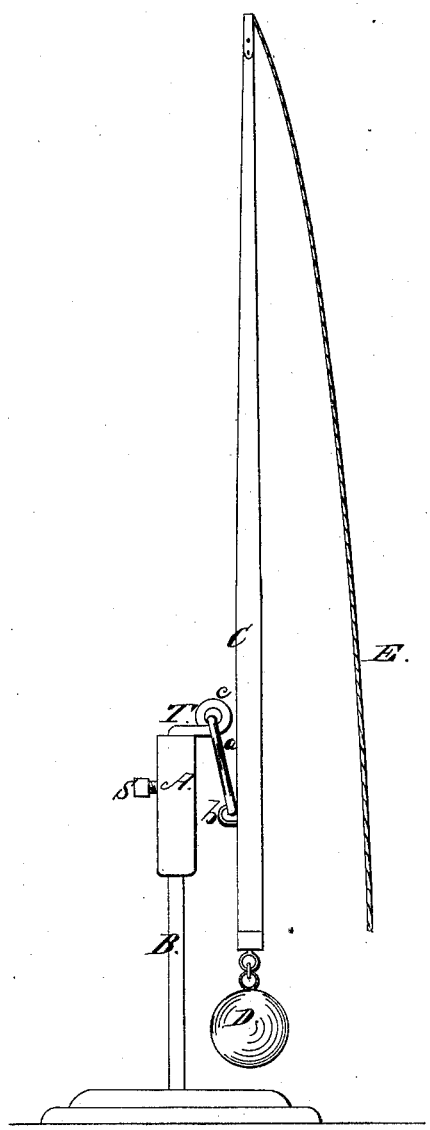
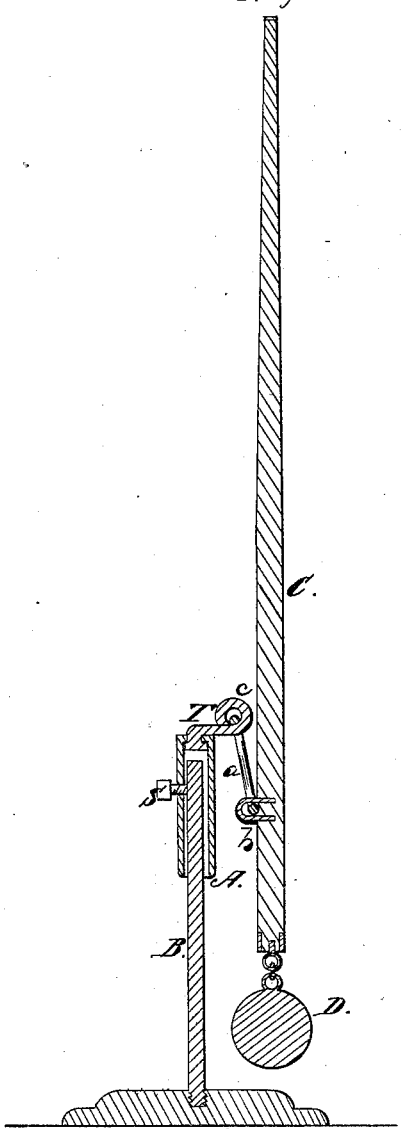
Witnesses
F. P. Hale Jr
G. H. Washburn
Inventor:
Warren Johnson
by his Attorney
R. H. Eddy

UNITED STATES PATENT OFFICE.

WARREN JOHNSON, OF FISHERVILLE, NEW HAMPSHIRE, ASSIGNOR TO HIMSELF AND ALBERT THOMPSON, OF SAME PLACE.

IMPROVEMENT IN DEVICES FOR TETHERING ANIMALS.

Specification forming part of Letters Patent No. 49,681, dated August 29, 1865.

*To all whom it may concern:*

Be it known that I, WARREN JOHNSON, of Fisherville, in the county of Merrimack and State of New Hampshire, have made a new and useful Invention or Improvement for Tethering Animals; and I do hereby declare the same to be fully described in the following specification and represented in the accompanying drawings, of which—

Figure 1 is an elevation, and Fig. 2 a vertical section, of my tethering apparatus.

The invention in question is an improvement with reference to that patented by Moses Johnson in Letters Patent No. 40,755, and dated December 1, 1863, the improvement consisting in a rotary swivel, a stationary cap or post, and means of fastening it (the latter) to the sustaining-bar, the object of my improvement being to prevent the detaching of the post from the sustaining-bar by the animal in case of the bar being pulled over into an inclined position. The said Moses Johnson employs for supporting his pole or lever on the said bar, which is driven into the earth, a post having a hole bored axially in it to receive the bar. In case the bar may become inclined, as frequently happens, owing to the force exerted upon it by the tethered animal, the post will be likely to be pulled off the bar; and, furthermore, the animal, by rubbing against the post, as he will at times, is liable to disconnect it from the bar. With my invention the post can be firmly fastened to the bar, and the swivel will turn freely in the head of the post, and is so applied thereto as to render it impossible for the animal to detach it therefrom.

In the drawings, A denotes the post, which is bored axially, so as to receive and encompass an arm, rod, or bar, B, which is to project vertically from the ground at or near the central part of the space on which it may be desirable to allow an animal to graze. This post A is provided with a set-screw, S, which screws laterally into it and against the supporting-bar, and serves to fix the post firmly thereto. At the head of the post there is a swivel or arm, T, so applied to the post as to be capable of being revolved in a circle thereon without being disconnected therefrom.

The tethering pole or lever C is suspended from the swiveling arm T by means of a ring, $a$, and a staple, $b$. The ring goes through the staple and an eye, $c$, made in the arm, the staple being driven into the lever C.

An overbalancing-weight, D, is suspended from the longer end of the pole or lever, a tethering-rope, E, being fastened to the other or lesser end of the said lever. The weight should be sufficiently heavy to raise or pull the lever, with the tethering line or rope attached to it, into, or about into, an upright position.

As the animal attached to the tethering-rope may move around the supporting-bar the post may be stationary thereon, the swiveling A will be stationary thereon, the swiveling arm at the head of the post allowing the lever to play around the post. As the animal may more or less move away from the post he will depress the lever, and as he may approach the post the lever will rise toward an upright position, the weight and the lever co-operating to so control the rope as to keep it elevated and out of the way of the animal or its legs.

With the improved tethering apparatus it will be impossible for the animal to wind the rope about the supporting-bar.

I do not claim a tethering apparatus consisting of the rope, the lever, and the post, made and applied together as represented in the aforesaid patent.

What I claim as my invention is—

The improvement described, it consisting of the rotary swivel or arm T, the stationary cap or post A, and the set-screw S, or equivalent means of fastening the post to the supporting-bar, the pole being applied to the said arm, and the whole being arranged in manner and so as to operate substantially as hereinbefore specified.

WARREN JOHNSON.

Witnesses:
R. H. EDDY,
F. P. HALE, Jr.